Dec. 30, 1969  R. D. PAGE ET AL  3,486,564

VERTICAL REFERENCE SYSTEM

Original Filed April 11, 1966  2 Sheets-Sheet 1

INVENTORS
RUSSELL D. PAGE  DEAN C. KLINGAMAN
WILLIAM H. BELKE  JOHN W. CRAYTON
ROLLAND D. SCHOLL

BY Fryer, Tjensvold, Feix & Phillips
ATTORNEYS

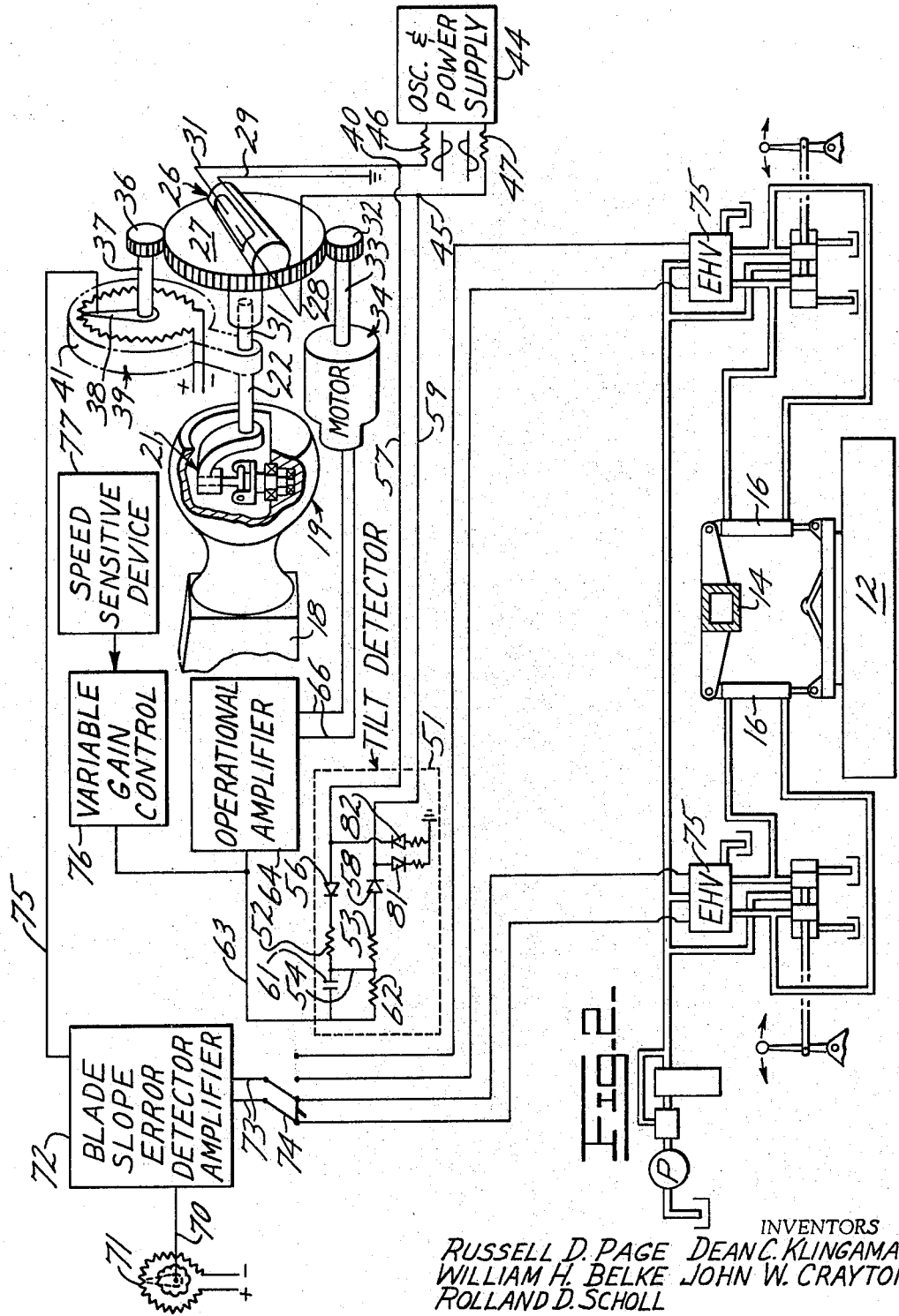

United States Patent Office

3,486,564
Patented Dec. 30, 1969

3,486,564
VERTICAL REFERENCE SYSTEM
Russell D. Page and Dean C. Klingaman, Decatur, William H. Belke, Peoria, John W. Crayton, Washington, and Rolland D. Scholl, Peoria, Ill., assignors to Caterpillar Tractor Co., Peoria, Ill., a corporation of California
Continuation of application Ser. No. 541,715, Apr. 11, 1966. This application Feb. 24, 1969, Ser. No. 804,358
Int. Cl. E02f *3/76*
U.S. Cl. 172—4.5                                    11 Claims

ABSTRACT OF THE DISCLOSURE

For controlling a movable element on an earth moving vehicle, a sensor on a rotatable element provides a first electrical signal when a deviation occurs, which first signal is employed to drive the rotatable element to correct such deviation with the restoration rate of such sensor controlled relative to vehicle speed, and a second sensor between the rotatable element and the movable element provides a second electrical signal when a change in their relative angular relationship occurs which is employed to restore their original selected relationship independent of vehicle orientation.

---

This application is a continuation of application Ser. No. 541,715, filed on Apr. 11, 1966 and now abandoned.

The present invention relates to a system for providing a reliably accurate vertical reference, and more particularly to a vertical reference system for earthmoving vehicles wherein the vertical reference is given by a powered pendulum.

The accuracy of a control system designed to maintain an implement or device at a selected relative angle is no greater than the accuracy of that portion of the control system which supplies the reference from which all angular measurements are made. Due to this simple fact, there has been a large number of systems devised for producing a reliable angular reference, most of which, due to the nature of the gravitational system in which most things exist, take the form of a vertical reference. Of the many vertical reference systems which have been developed, almost all of them employ as the basic reference producing element either a pendulum or a gyroscope. Due to the relatively delicate nature of gyroscopes, they are not commonly found in conjunction with control systems employed in rugged environments wherein delicate devices cannot long survive. Thus, it is almost universal to employ a pendulum as a vertical reference in blade control systems for motor graders, bulldozers and similar types of earthmoving machines.

The basic nature of a pendulum poses certain inherent limitations on the accuracy of the vertical reference provided thereby, and thus introduces into any system with which it is associated a certain error factor. While the inherent error in a pendulum reference system can be tolerated in certain practical applications, the desired, and often required accuracy of operation of certain earthmoving machines, such as motor graders, cannot tolerate the errors introduced by control systems having a pendulum vertical reference. Thus the present invention teaches a new concept in vertical reference systems which eliminates those sources of error basic to pendulum reference systems.

The main sources of error associated with a high mass pendulum reference system are introduced by bearing friction, drag and slow response due to the necessity of providing a damping medium. Since a pendulum operates to provide a vertical reference by virtue of its natural tendency to assume a position in line with the earth's gravitational field, it must be free to rotate relative to its mounting structure. This makes it essential for the bearings which support the pendulum to be of extremely low friction in order that small changes in the angle of the pendulum mounting will produce similar small angular changes in the position of the pendulum relative to the mounting. If the bearings are not of high quality (low friction), then it will be possible for the pendulum mounting to change its angle without overcoming the bearing friction and thus without the pendulum changing its angle relative to the mounting.

A more serious source of error than the bearing friction, however, is introduced by the drag which is produced by the mechanism which measures the relative angular movement between the pendulum and the pendulum mounting. An often used means for measuring the angular change between a pendulum and its mounting is a potentiometer having its wiper arm mechanically associated with the pendulum, and its resistance element fixed to the mounting (or vice versa). When the drag produced by the angular measuring device combines with the pendulum bearing friction in a cumulative manner, it is possible for the pendulum to assume a position other than perfectly vertical, and thus fail to produce an accurate reference from which all other angular measurements are made throughout the system.

Since a pendulum mounted on low friction bearings is highly unstable in the conditions to be expected when used in conjunction with an earthmoving vehicle, it is necessary in order to eliminate erratic operation to dampen the pendulum as by placing it in a housing filled with a viscous fluid. When a pendulum is so disposed it will not respond to vibrations produced by the vehicle engine, for instance, or minor terrain irregularities which produce shocks through the vehicle suspension system. The viscosity of the fluid in which the pendulum is disposed, however, greatly increases the response time of the pendulum and also tends to magnify the error introduced by the friction of the bearings and the drag of the angular measuring system.

Because of the several factors described above, the ability of a pendulum to assume a true vertical position at all times is highly doubtful, and thus under the best conditions it is only able to produce a vertical reference of moderate accuracy. Since the required accuracy of some earthmoving machines cannot tolerate errors as large as those produced by a pendulum reference (e.g. motor graders are expected to operate within accuracies of one-eighth of an inch in ten feet), pendulum operated vertical reference systems are not fully capable of meeting the requirements of many systems.

The fundamental distinction between the vertical reference system of the present invention and a vertical reference system employing a pendulum, is that in the present invention the vertical reference element is power operated to its reference position, and is not dependent on gravitational forces to drive it to its reference position. Thus, the present invention can be characterized as a powered pendulum in that it has a vertical reference position to which it is power operated when it is moved away from this vertical reference position. By virtue of being power operated to its reference position, the accuracy of the powered pendulum of the present invention is substantially independent of the friction of bearings supporting it, as well as the drag produced by angular measuring means associated therewith. In addition, the powered pendulum of the present invention does not employ a large mass disposed in a viscous fluid, but instead employs an electrolytic potentiometer. By eliminating a large mass in a viscous fluid, the present invention reduces the response time of the vertical reference of the present invention materially over free-swinging pendulum systems presently known in the art.

Accordingly, it is an object of the present invention to provide a powered pendulum vertical reference system which reduced many of the error factors inherent in free-swinging pendulum reference systems.

Another object of the present invention is to provide a vertical reference system suitable for use in conjunction with earthmoving vehicles such as motor graders as a part of an automatic blade control system wherein the accuracy of the vertical reference is substantially independent of bearing friction and drag produced by angular measuring devices, and does not inlude a heavy mass disposed in a viscous fluid and thus exhibits much faster response time.

It is a further object of the present invention to provide as part of an automatic blade control system a vehicle speed operated variable gain control which operates to eliminate scalloping.

Further and more specific objects and advantages of the present invention are made apparent in the following specification where a preferred form of the invention is described by reference to the accompanying drawing.

In the drawing:

FIG. 2 is a semi-schematic illustration of the power-driven pendulum of the present invention operatively disposed in conjunction with other components forming an automatic blade control system for a motor grader;

Figure 1:
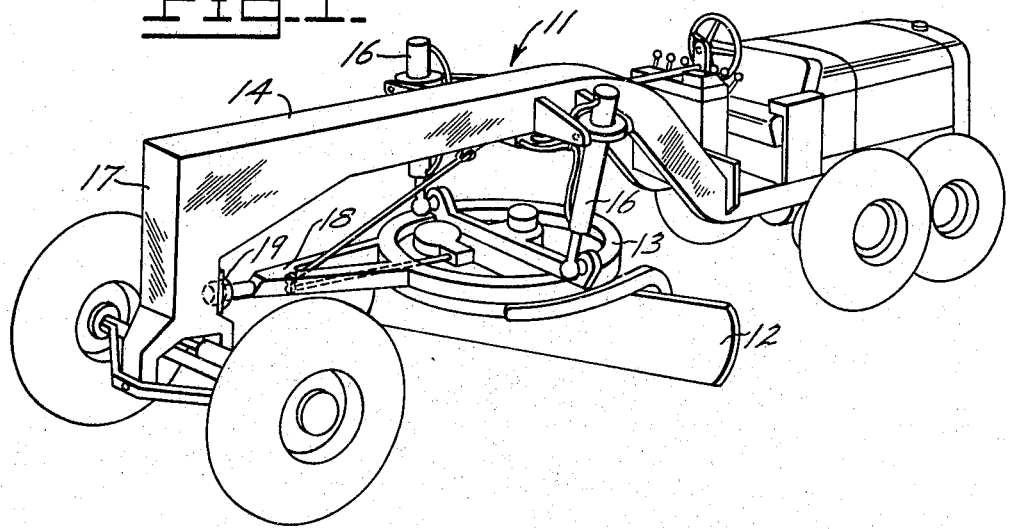
FIG. 1 is an isometric illustration of a motor grader equipped to employ the present invention.

Referring now to FIGS. 1 and 2 a motor grader 11 includes a working blade 12 supported by a blade circle 13 which is secured to the main frame 14 by extensible, hydraulically operated jacks 16. The circle 13 is also secured to the bolster 17 of the motor grader by a drawbar 18 which is fixedly secured at one end to the circle 13 and pivotally secured at its other end to the bolster 17 through a ball and socket connection 19.

Secured within the ball 19 is a blade slope simulator mechanism 21 which is fully described in assignee's patent entitled "Automatic Blade Control for a Road Grader With a Blade Simulator Mounted in a Ball and Socket Connection," No. 3,229,391. For the purposes of the present invention it suffices to say that the blade slope simulator mechanism 21 operates to rotate a shaft 22 whenever the drawbar 18 is rotated about its axis as when the slope of the blade 12 is changed by extending or retracting one of the hydraulic jacks 16.

In operation, the blade 12 is positioned to a desired slope by appropriate adjustment of the jacks 16. When the desired slope is achieved there is a fixed angular relationship between the frame of the motor grader and the blade 12 which is changed only by changing the length of one of the jacks 16. When the motor grader is operating on substantially level ground, the desired slope between the blade and the ground will be achieved and the control system will be in a static state. When the wheels of the motor grader encounter irregular terrain, however, the angle of the motor grader frame is altered which results in the slope of blade 12 being altered since the angular relationship between the blade and the frame is fixed so long as the jacks 16 remain in a given position. Since the slope of the blade changes with respect to the ground due to the irregular terrain, it is necessary to extend or retract one of the jacks 16 in order to return the blade to the desired slope relative to the ground so that the earthworking operation can continue with the blade at the proper orientation. In order to automatically maintain the blade 12 at a given slope, regardless of the angle of the frame 14, it is necessary to accurately measure angular deviations of the frame from a given position and respond to such angular deviations by extending or retracting one of the jacks 16 until the angular deviation of the frame is compensated for by an appropriate change in the angular relationship between the frame and the blade 12.

As previously described, it is customary in systems of this type to employ a pendulum to give a vertical reference from which all angular changes of the frame can be measured, and from which the necessary changes in blade angle relative to the frame are determined. Since the speed of operation of a motor grader having an automatic blade control system is largely dependent on the response time of the blade slope control system, it is extremely important for the fast response time to be short—a characteristic absent from viscous damp pendulum systems previously discussed. Further, the accuracy with which the blade 12 is maintained at a desired slope depends on the accuracy of the measurement of the deviation of the frame from the vertical reference. Thus, any errors produced due to the vertical reference portion of the control system are reflected in the operation of the equipment, and thus must be avoided wherever possible.

In the place of a free-swinging mass pendulum, the present invention employs an electrolytic potentiometer 26 secured on a gear 27. Electrolytic potentiometers are well known in the art and operate through the action of an air bubble trapped in a curved glass section containing an electrolyte which creates variable impedance between two sets of electrodes. Thus, in the present invention the impedance between the first electrode 28 and a ground electrode 29 is the same as the impedance between a second electrode 31 and the ground electrode 29 only when the electrolytic potentiometer 26 is horizontal (its trapped air bubble is centered). When the potentiometer 26 is placed in a position other than horizontal, the air bubble will off center and establish a difference in impedance between the two input electrodes and the ground electrode. This indicates that the potentiometer is at a non-horizontal orientation. Since electrolytic potentiometers are well known in the art and have been recognized as having exceptional characteristics such as highly damped action, and an output which is proportional to the deviation from horizontal, the present invention does not reside in the potentiometer 26 itself, but rather in the powered pendulum vertical reference system which is taught by the present invention and which uses the potentiometer 26 as the source of a vertical reference.

The gear 27 to which the potentiometer 26 is affixed is rotatably secured on a shaft 31 so as to be free to rotate about a central axis. The gear 27 meshes with a smaller gear 32 which is carried on one end of a shaft 33 the other end of which is joined to and power driven by a motor 34 which is mounted on bolster 17. A second gear 36 also meshes with gear 27 and is secured on one end of a shaft 37, the other end of which is secured to the wiper arm 38 of a potentiometer 39. The potentiometer 39 includes a housing or case 41 which is secured to the shaft 22 for rotation therewith. Thus, when the shaft 22 rotates the potentiometer 39 is also rotated about a non-central axis. Rotation of housing 41 causes the gear 36 to walk around the gear 27 and in so doing change the position of the wiper arm 38 relative to the potentiometer case 41. By establishing a high ratio between gear 27 and gears 32 and 36 (e.g. 6:1) it is possible to accurately detect small angular changes so as to give the system a high degree of accuracy.

The potentiometer 39 serves as a means for measuring relative angular changes between the vertical reference potentiometer 26 and its mounting, while the motor 34 serves as the power means for returning the vertical reference to its vertical position. As will be shown in detail below, the motor 34 begins to return the vertical reference to its vertical position with the initial movement of the vertical reference system from its true vertical position, without waiting for the full excursion of the reference to occur. One of the most outstanding features of the present invention is the fact that the vertical reference comprised of electrolytic potentiometer 26 and gear 27 is positively driven to a given vertical position by the motor 34 such that the quality of the bearing between the gear 27 and shaft 31, and the drag produced by the gear 36 do not significantly affect the accuracy of the vertical reference signal provided by the electrolytic potentiometer and gear combination.

An oscillator and power supply 44 produces a pair of A.C. voltages across output resistors 46 and 47 wherein the voltages are 180° out of phase. The resistor 46 is electrically joined to the electrolytic potentiometer electrode 31, while the resistor 47 is electrically joined to the potentiometer electrode 28. While the output voltages of oscillator and power supply 44 are 180° out of phase, they are of like magnitude such that the voltages at junctions 40 and 45, between resistors 46 and 47 and electrodes 31 and 28, respectively, will be equal when the electrolytic potentiometer is in a horizontal position producing an impedance between the electrode 31 and ground electrode 29 which is equal to the impedance between electrode 28 and ground electrode 29. When the motor grader engages irregular terrain which causes its frame to change its angular position, the potentiometer 26 will be tilted causing the relative impedances between the input electrodes and the ground electrode to change, with a resulting proportional change in the relative voltages at junctions 40 and 45.

A tilt detector circuit 51 is formed by a pair of like resistors 52 and 53 which are joined to each other by a conductor 54. The resistor 52 is also joined to the cathode of a diode 56, the anode of which is joined to junction 40 by a conductor 57. The resistor 53 is electrically joined to the anode of a diode 58, the cathode of which is electrically joined to the junction 45 by a conductor 59. The diodes 56 and 58 act as half-wave rectifiers such that only the positive portions of the output across resistor 46 are able to pass diode 56, and only the negative portions of the output across resistor 47 are able to pass diode 58. Thus, the voltage across resistor 52 is in the form of a pulsed positive D.C. while the voltage across resistor 53 is in the form of a pulsed negative D.C. When the vertical reference is in its vertical position (potentiometer 26 is horizontal), the voltage across resistors 46 and 47 are equal as explained above, and thus the positive D.C. voltage across resistor 52 is equal to the negative D.C. voltage across resistor 53 such that the combined voltages cancel one another and produce a zero voltage at common conductor 54.

When the vertical reference is tilted off of its vertical position, however, there is a relative voltage difference between junctions 40 and 45, which produces a net negative or net positive voltage on conductor 54 (depending on which way the reference is tilted), such that the compensating circuit formed by the parallel connection of capacitor 61 and resistor 62 produces a voltage on conductor 63 which leads to the input of an operational amplifier 64. The operational amplifier 64 responds to a negative voltage to produce an output on conductors 66 which drives motor 34, to which conductors 66 are connected, in one direction, while a positive voltage input on conductors 63 results in the motor 34 being driven in the opposite direction. The important relationship to be established is that the motor 34 is always driven in the direction which tends to restore the electrolytic potentiometer 26 to its horizontal position, and thus the vertical reference to its vertical position. The motor 34 will be operated until such time as the electrolytic potentiometer 26 is restored to its horizontal position and the voltages at junctions 40 and 45 are once again equal.

Since the angle through which the motor 34 must drive the gear 27 in order to return the electrolytic potentiometer 26 to its horizontal position, is an accurate measure of the angular tilt of the frame of the motor grader due to the irregular terrain, it can be used to determine how much one of the jacks 16 must be lengthened or shortened in order to maintain the blade 12 at a given slope. The means for measuring the relative angle which the gear 27 passes through in restoring the potentiometer 26 to its horizontal position, is the potentiometer 39 and its gear-driven wiper arm 38. A manually operated potentiometer 71 provides a voltage which represents the desired blade slope and directs that voltage via conductor 70 to a blade slope error detector amplifier 72. The voltage at the wiper of potentiometer 39 represents the actual blade slope, and it is directed to the blade slope error detector amplifier 72 via conductor 75. When the voltage representing desired blade slope is equal to the voltage representing actual blade slope, the blade slope error detector amplifier does not produce an output and the blade slope is not altered. Thus, if we assume that the two inputs to the error detector 72 were equal prior to the motor 34 driving the gear 27, then during the interval in which the gear is being returned to its vertical reference position, the input voltages to the error detector will not be the same since the position of the wiper arm 38 was changed by rotation of gear 27, and thus the voltage output at the wiper arm of the potentiometer 39 was also changed.

Dissimilar input voltages to error detector 72 result in voltage at the error detector output conductors 73 which are joined through a manually operated switch 74 to electro-hydraulic valves 75 which control the rate of fluid flow to jacks 16 as a function of voltage. A detailed discussion of the manner in which the jacks 16 are operated through an output signal from error detector 72 is clearly set forth in assignee's Patent No. 3,229,391, making it unnecessary to repeat that description here. As will be seen by reference to the aforementioned patent, hydraulic fluid is directed to one end of jack 16 depending on which of the inputs to the error detector is greater. As long as there is a discrepancy between the magnitude of the voltages at the inputs of error detector 72, hydraulic fluid will be directed to one end of jack 16 causing the jack to change its length, and thereby change the slope of blade 12. The particular end of jack 16 which receives hydraulic fluid depends on whether or not the jack must be lengthened or shortened in order to return the blade to the desired slope. As the angle of the blade 12 is being changed through the introduction of hydraulic fluid to a jack 16, there is a corresponding angular change in the orientation of the drawbar 18, which results in rotation of the shaft 22. As the shaft 22 rotates, it causes a rotation of the potentiometer 39, which causes the gear 36 to walk around the periphery of gear 27 and thus change the position of the wiper 38. When the wiper 38 reaches that angular position relative to potentiometer case 41 which produces a voltage which equals the voltage from potentiometer 71, the blade slope error detector amplifier 72 will cease to have an output and the fluid will cease to be delivered to one of the jacks 16. Since the voltage from potentiometer 39 is equal to the voltage from potentiometer 71, the desired slope and the actual slope are the same and the desired result has ben achieved.

In order to prevent chemical deterioration of the electrolytic potentiometer 26, a pair of oppositely oriented diodes 81 and 82, each connected in series with a resistor, are joined in parallel across conductors 59 and 57.

Since the motor 34 begins to operate wherever there is a difference between the voltages at junctions 40 and 45, it is not necessary for the system to wait for the vertical reference to make its full excursion from the vertical before it begins to drive the gear 27. In addition, the voltage applied to the motor 34 and thus the speed at which the gear 27 is driven is approximately proportional to the magnitude of the deviation of the vertical reference from the vertical position. The amplitude of the voltage applied to motor 34 also depends upon the gain of the system which is a function of vehicle speed. This provides a system with optimum response times. Also, since the motor 34 is operated solely as a function of the position of electrolytic potentiometer 26, the existance of friction in the coupling between shaft 31 and gear 27, and the drag produced by the gear 36 have no significant effect on the ability of the gear 27 and potentiometer 26 to form an accurate vertical reference.

Due to the relationship of the blade 12 to the wheels of the motor grader, it has been found that at certain operating speeds there is a tendency for oscillations to be established which produce scalloping which is extremely undesirable. In order to prevent this from occurring, the present invention teaches the use of a variable gain control circuit 76 as an additional input to the operational amplifier 64. In effect, the variable gain control circuit 76 operates to change the level of output voltage on conductor 66 for a given input signal on conductor 63 as a function of vehicle speed. The vehicle speed is transduced into an electrical signal as by a tachometer (not shown), or other speed sensitive device generally indicated at 77. The electrical signal for device 77 is introduced to the variable gain control 76 which operates to produce an output signal proportional to the input signal from the speed sensitive device, and introduces that output signal to the operational amplifier 64 for controlling the gain of the operational amplifier. By properly adjusting the output from variable gain control circuit 76 relative to the signals to be expected on conductor 63, it is possible to completely eliminate scalloping at all speeds, and thus enable the motor grader to operate at peak efficiency.

Figure 3:
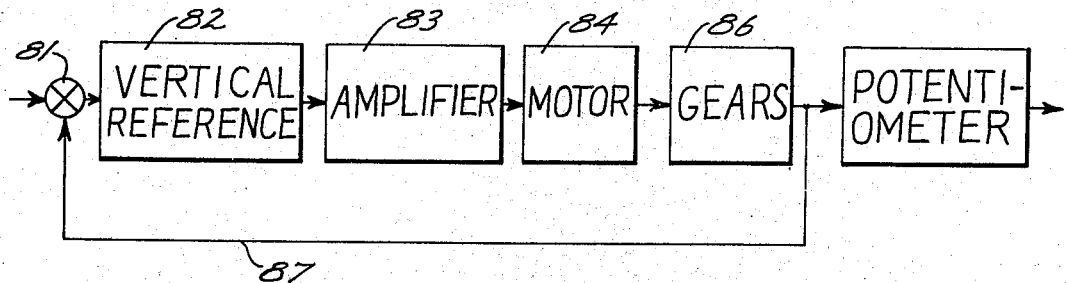
FIG. 3 is a block diagram of the powered pendulum portion of the motor grader blade control system as shown in FIG. 2.

While the powered pendulum system of the present invention has been described primarily in conjunction with an automatic blade control for a motor grader, the invention is not so limited. The powered pendulum system as taught by the present invention is useful in many applications where pendulums are presently being employed. FIG. 3 illustrates in block diagram form the essential features of a powered pendulum which comprise the present invention. An angular summing junction 81 receives an angular input and directs it to a vertical reference 82 including an electrolytic potentiometer, or similar device capable of transducing angular position to an electrical voltage. The introduction of an angular change to the vertical reference produces an output voltage which is directed to an amplifier 83, which in turn directs the voltage to a motor 84. The motor transduces the voltage into angular movement through rotation of its shaft. The angular output of the motor 84 is directed to one or more gears 86 which direct the angular change brought about by the voltage to the motor 84 to the summing junction 81 through a feed-back loop 87. When the angular quantity produced by the gears 86 totally counteracts the input angular quantity, the system will achieve a steady state condition. The potentiometer which receives the output from gears 86 transduces gear movement into voltage and provides an electrical quantity proportional to the angular change in the vertical reference 82.

We claim:

1. A powered vertical reference system in combination with a control system for controlling a movable element on an earthmoving vehicle comprising:

a rotatable means supported on said vehicle for rotation about a substantially horizontal axis;
   sensing means mounted on said rotatable element means for producing a first electrical signal proportional to its deviation from vertical when it and said rotatable means are displaced from vertical about such horizontal axis;
   electric drive means drivingly connected to said rotatable means to rotate it about its horizontal axis;
   control means connected to said sensing means and said electric drive means for transmitting the first electrical signal to the electric drive means to impart a rotary movement to the rotatable element for restoring such element to vertical, said control means including rate means for varying the restoration rate of said rotary element, and
   means connecting said rotatable means to the control system for the movable element on the vehicle for producing a second electrical signal in response to said rotary movement for maintaining said movable element in a pre-selected relationship relative to said rotatable means.

2. The powered vertical reference system combination as defined in claim 1 wherein the rate means is connected to speed sensing means in the vehicle so that restoration of said rotatable means to vertical is proportional to vehicle speed.

3. The powered vertical reference system combination as described in claim 1 wherein the vehicle is a motor grader and the movable element is the moldboard of said motor grader.

4. The powered vertical reference system combination described in claim 3 wherein the control system for the movable element includes a simulator mechanism to correct for angularity of the moldboard relative to the longitudinal axis of the motor grader.

5. The powered vertical reference system combination as described in claim 1 wherein the control system connected to the rotatable means includes response circuits operable to adjust the sensitivity of the said control system which are independent of the vertical reference position provided by said rotatable element.

6. The vertical reference system combination as defined in claim 5 wherein the rotatable means is connected to one part of a potentiometer in the control system for the moldboard and said moldboard is mechanically connected to the other part of said potentiometer through a simulator mechanism whereby the control system operates to drive said moldboard to maintain said parts of said potentiometer in a preselected relationship as the motor grader moves across terrain.

7. The powered vertical reference system combination described in claim 1 wherein the rate means of the reference system is adjusted proportional to vehicle speed.

8. The powered vertical reference system combination as defined in claim 1 wherein the sensing means is an electrolytic potentiometer.

9. The powered vertical reference system as defined in claim 8 wherein the electrolytic potentiometer includes a first electrode, a second electrode and a ground electrode and the electrically operated drive means includes a source of AC voltage connected to said first electrode so the magnitude of the voltage is proportional to the impedance between said first electrode and said ground electrode, and said voltage source further connected to said second electrode so the magnitude of the voltage is proportional to the impedance between said second electrode and said ground electrode and the magnitude of the voltages at the first and second electrodes being equal when said electrolytic potentiometer is in a horizontal position, the control means connected to detect the differences in magnitude of the voltages at said first and second electrodes.

10. The powered vertical reference system combination as defined in claim 1 wherein the vehicle is a motor grader and the controllable element is a motor grader moldboard maintainable at a preselected slope and the control system between said rotatable means and said motor grader moldboard includes potentiometer connected to said rotatable means and to a slope simulator which is connected to said moldboard so that its variations relative to said rotatable element, corrected through the simulator, will generate an electrical signal representative of true blade slope.

11. The powered vertical reference system combination as defined in claim 10 wherein the control system includes a bridge circuit which causes a electrohydraulic means to continually position the motor grader moldboard relative to electrical signals appearing in the bridge circuit.

References Cited

UNITED STATES PATENTS

| | | | |
|---|---|---|---|
| 2,904,911 | 9/1959 | Colee | 172—4.5 |
| 2,713,727 | 7/1955 | Balsam. | |
| 2,893,134 | 7/1959 | Shea et al. | 33—206.5 |
| 2,926,530 | 3/1960 | Mueller et al. | |
| 3,029,715 | 4/1962 | Bowen | 172—4.5 X |
| 3,094,796 | 6/1963 | Atchley | 172—4.5 |
| 3,096,591 | 7/1963 | Higgins et al. | 33—206.5 |
| 3,171,213 | 3/1965 | Swarts et al. | |
| 3,229,391 | 1/1966 | Breitbarth et al. | 172—4.5 |
| 3,271,650 | 9/1966 | Riddle. | |

ROBERT E. BAGWELL, Primary Examiner

ALAN E. KOPECKI, Assistant Examiner